Dec. 21, 1943. C. B. JENSEN 2,337,108
PLOW RAKE
Filed Aug. 6, 1942 5 Sheets-Sheet 1

INVENTOR
CHRIS B. JENSEN
By Paul, Paul & Moore
ATTORNEYS

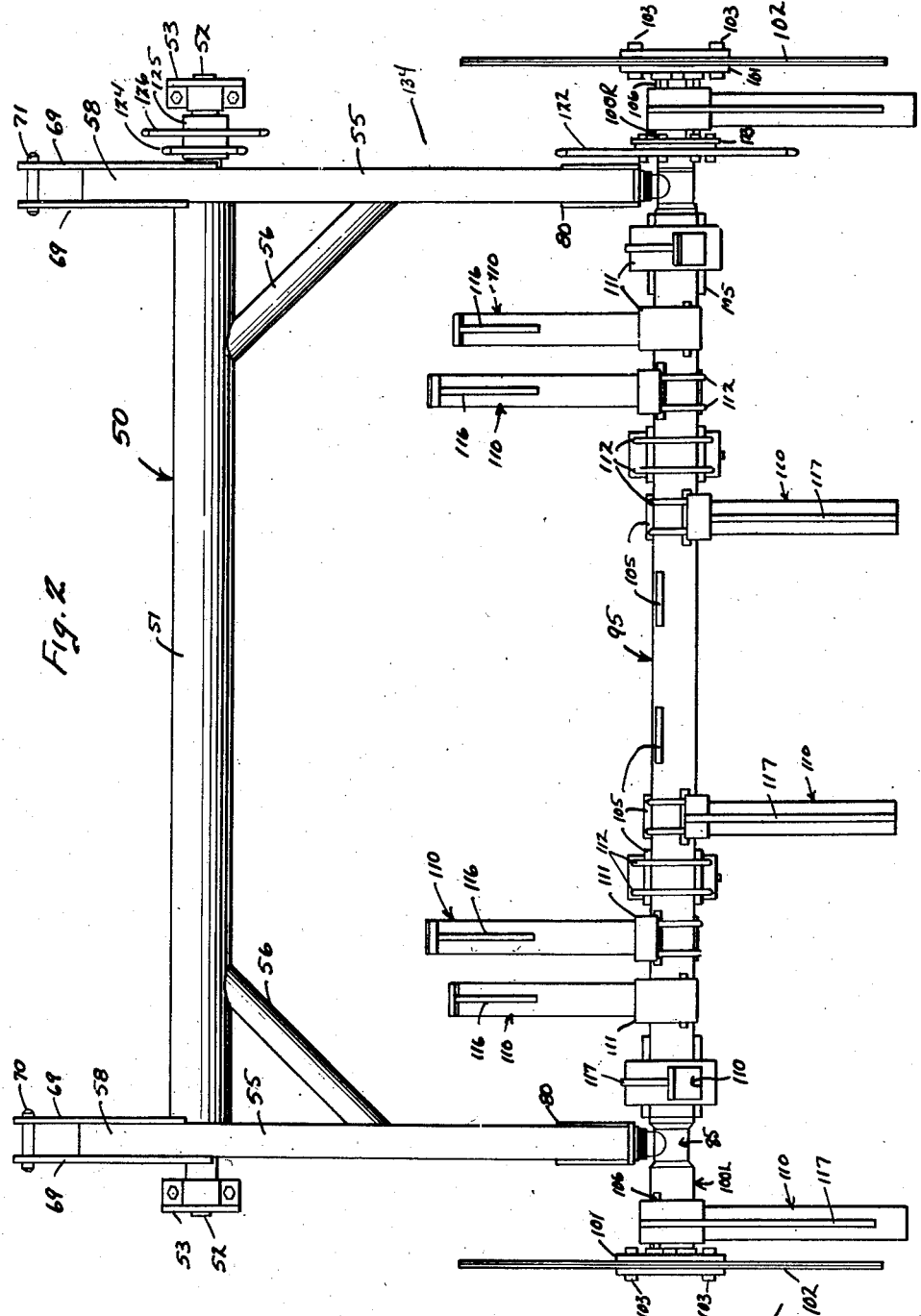

Dec. 21, 1943.   C. B. JENSEN   2,337,108
PLOW RAKE
Filed Aug. 6, 1942   5 Sheets-Sheet 3
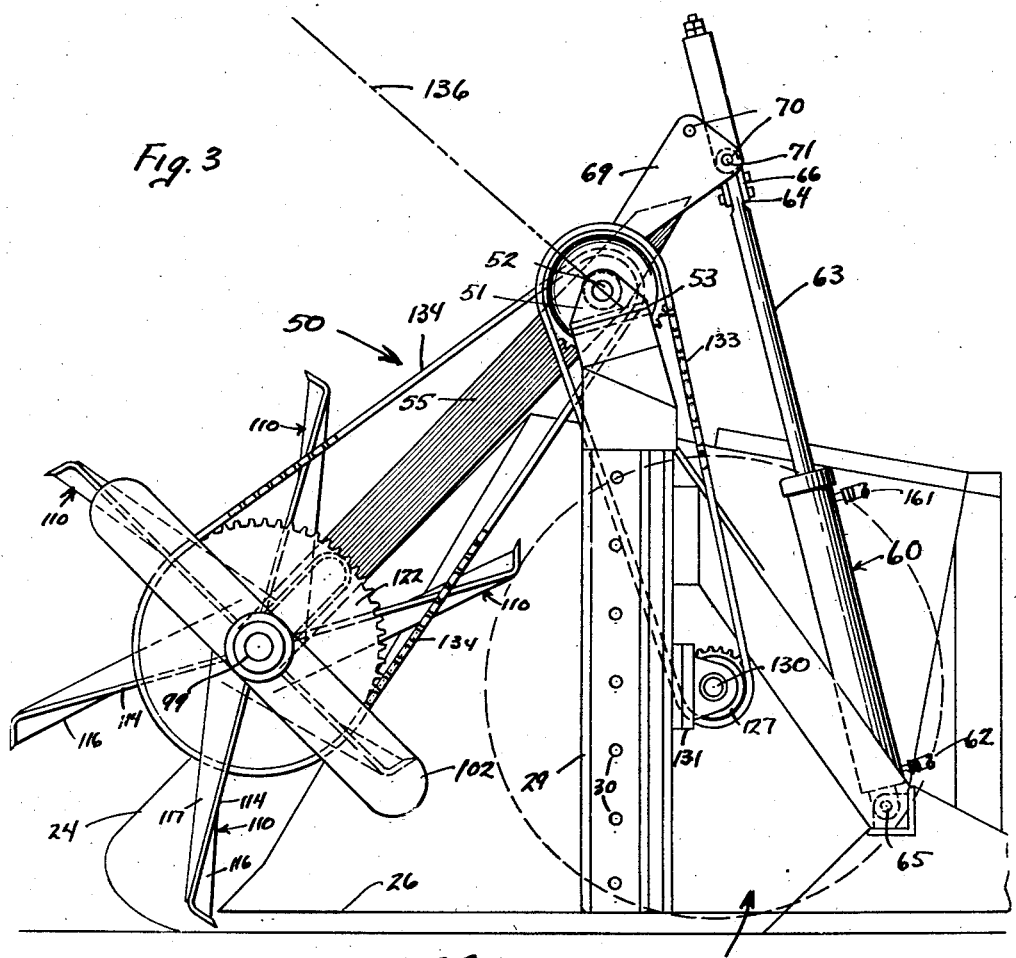
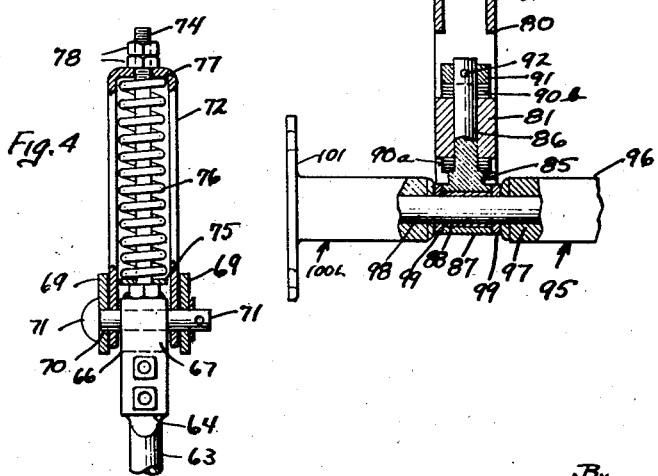
INVENTOR
CHRIS B. JENSEN
By Paul, Paul & Moore
ATTORNEYS Dec. 21, 1943.  C. B JENSEN  2,337,108
PLOW RAKE
Filed Aug. 6, 1942   5 Sheets-Sheet 4

INVENTOR
CHRIS B. JENSEN
B. Paul, Paul & Moore
ATTORNEYS

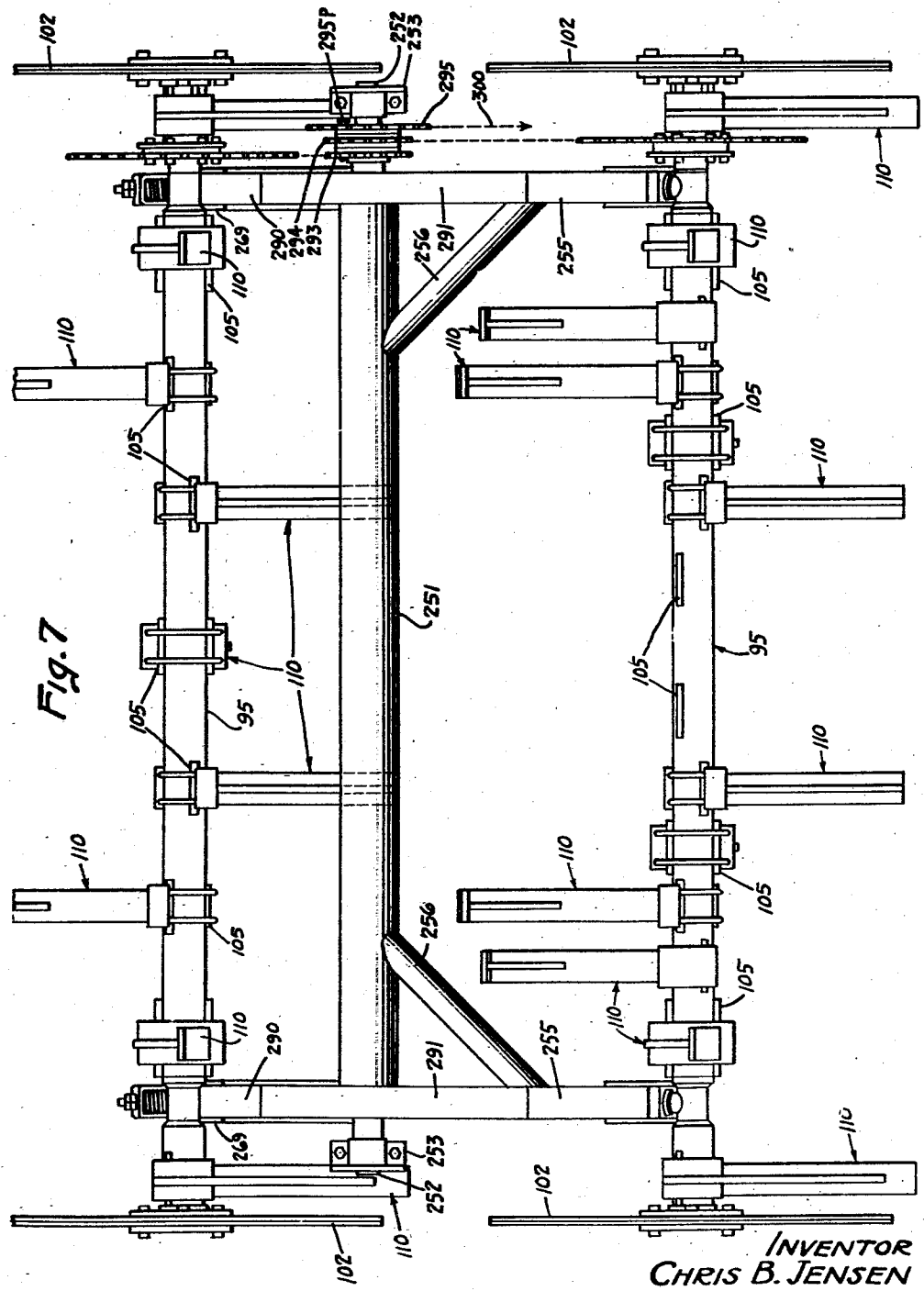

Patented Dec. 21, 1943

2,337,108

UNITED STATES PATENT OFFICE 2,337,108

PLOW RAKE

Chris B. Jensen, St. Paul, Minn., assignor to Wm. Bros Boiler & Manufacturing Co., Minneapolis, Minn., a corporation of Minnesota Application August 6, 1942, Serial No. 453,822

10 Claims. (Cl. 37—43)

This invention relates to rotary rake mechanisms for use in conjunction with snow plows, particularly rotary snow plows. In the use of rotary snow plows, drifts are frequently encountered which are higher than the upper edge of the plow and while such rotary snow plows are capable of ejecting the total volume of snow of the drift to great distances at the side of the roadway, excessive amounts of power are required for breaking up hard snow and for dislodging the upper portions of large drifts preparatory to handling by the plow proper.

In order to overcome this difficulty in snow removal operations, it has frequently been necessary to station men on the drifts to dislodge the upper portions of the drift allowing such portions to fall downwardly in a position to be engaged by the plow. This makeshift expedient is of only slight practicability and is exceedingly expensive.

In accordance with one form of the present invention a rotary snow rake is mounted on the plow in a manner such that it may be raised or lowered in accordance with the height of the drift encountered for preliminarily breaking up the drift so that it may be engaged by the plow and ejected, and, it is therefore an object of the invention to provide an improved rotary rake mechanism for snow plows and particularly a mechanism capable of being instantly adjusted to various heights and capable of maintaining such adjustment.

In accordance with another form of the invention it is an object to provide rotary rakes at several levels with provision for operating one or both of them in accordance with the height and solidity of the drifted snow being encountered.

It is a further object of the invention to provide a rugged and practical rotary rake frame carrying one or more rotary rakes and improved mechanisms capable of allowing the rake frame, or frames, a limited freedom of movement in accommodation of excessive non-uniform stresses imposed upon the rake by ice incrustations of irregular nature or due to extraneous obstacles encountered during operation.

It is a further object of the invention to provide an improved rotary rake frame and rake shaft mounting arrangement whereby momentary distortions of the rake frame are accommodated without injury to the mechanism and also to provide for adequate adjustment of the mechanism in service.

It is a further object of the invention to provide improved rake members having a shape especially designed for strength and snow breaking and moving ability; and to provide for improved mounting of such rake members upon a rotary rake shaft without impairing the strength of such shaft.

It is a further object of the invention to provide in a rotary rake mechanism slicing blades for cleanly cutting down the snow sidewall.

Other and further objects of the invention are those inherent in the mechanism herein illustrated, described and claimed.

The improved rotary rake apparatus of the present invention is illustrated with reference to the drawings in which:

Figure 2 is a plan view of the rake mechanism operated from the plow on which it is adapted to be mounted and with certain parts removed for purposes of clarity.

Figure 3 is a side elevational view showing the rotary rake mechanism in a lowermost position and mounted upon a rotary snow plow in conjunction with which it is used.

Figure 4 is a fragmentary sectional view of the operative connection between the rotary rake mechanism and the mechanism for angularly adjusting the elevational position of the rake.

Figure 5 is a fragmentary sectional view of an end of the rotary rake shaft and its bearing mounting structure.

Figures 6 and 7 are, respectively, a side elevational view and a front elevational view of a modified form of the invention.

Throughout the drawings and specification the same numeral indicates corresponding parts.

Figure 1:
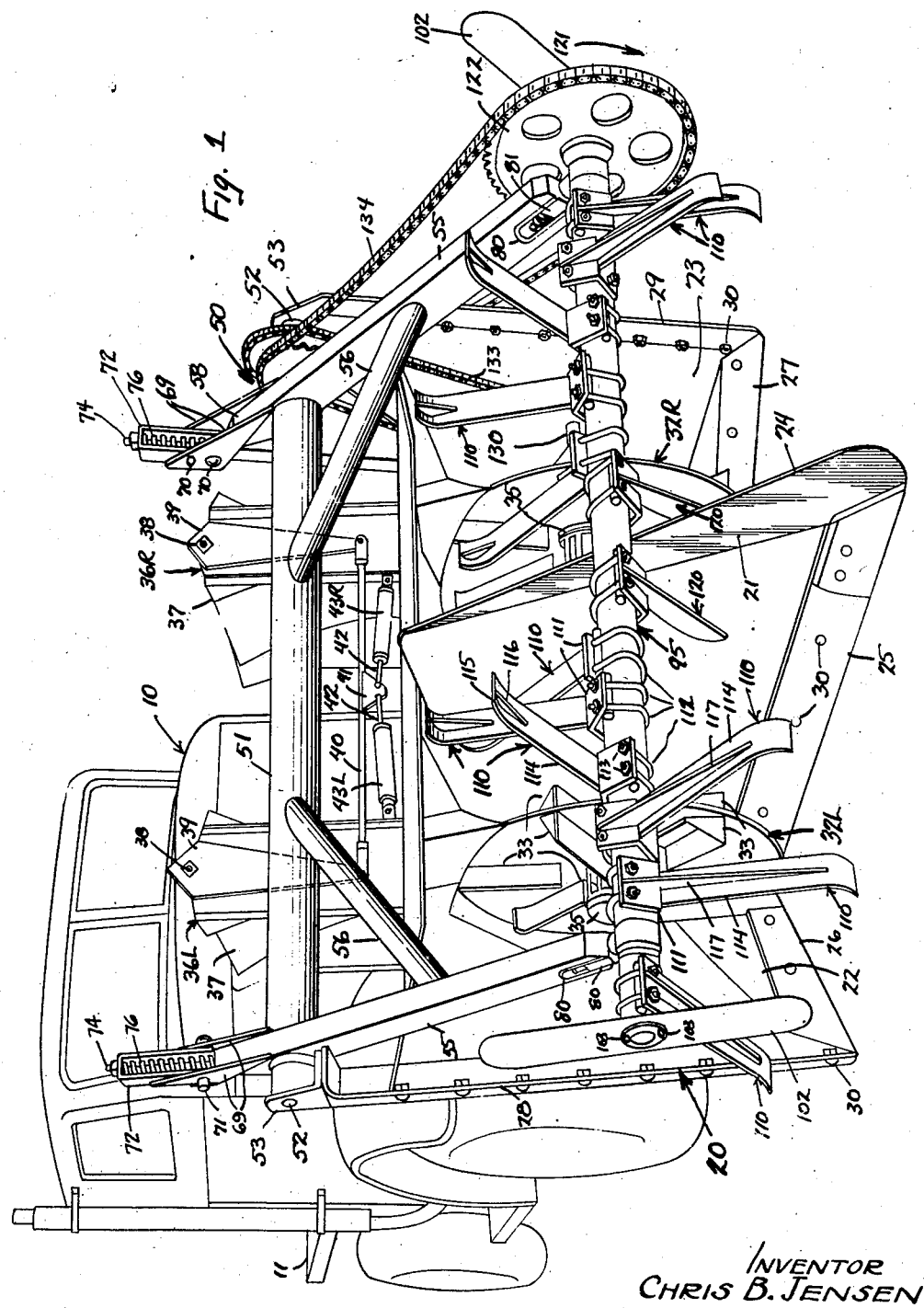
Figure 1 is an isometric front side view showing the rake mechanism in one of its operating positions and mounted upon a rotary snow plow propelled in front of a traction vehicle.

Referring to Figure 1, 10 generally designates a traction vehicle which, in this instance, is a heavy truck upon the front of which there is mounted a rotary snow plow generally designated 20. The rotary snow plow consists of a W-shaped moldboard having a front prow portion 21 and side wings 22 and 23, the prow 21 and side wings 22 and 23 being solidly formed with each other so as to present to the snow a moldboard of generally W-shape in horizontal section viewed from the vehicle seat. The prow 21 is provided with a splitter blade 24 and with scarfing blades 25 on each side. The side wings 22 and 23 are provided with similar scarfing blades 26 and 27, and with upright snowbank blades 28 and 29. All of the blades are preferably removably mounted on the rotary snow plow for replacement when necessary. In the illustrated embodiment, the removable mounting is accomplished by means of bolts and nuts 30.

Between side wing 22 and the left side of prow 21 as illustrated in Figure 1 there is positioned a rotary snow impeller, generally designated 32L, having a plurality of snow impelling blades 33 on each side of it. The rotary snow impeller is provided with an operating recess between the prow 21 and the side wing 22 so that it is partially positioned in the recess and partially exposed. At the right side of the prow 21 there is a similar rotary snow impeller, generally designated 32R. Both snow impeller rotors 32R and 32L are mounted for rotation upon an impeller shaft 35 which is transverse of the direction of motion of the plow. Rotation is counterclockwise as viewed in Figure 3.

Above each of the impellers is a snow ejecting opening above which there are disposed mechanisms 36L and 36R for directing the snow either to the right or to the left of the vehicle. The mechanisms 36R and 36L are identical and hence only one need be described. The mechanism includes a snow deflector blade 37 of generally V-shaped cross section, which is mounted on a pivot shaft 38 spaced above the upper end of the blade. The mechanism 36R is provided with an operating arm 39 and is connected by the drag link 40 to the similar operating arm 39 of the mechanism 36L. If desired, the operating arms 39—39 may be joined to the pivot shafts 38—38 by shear pins to avoid damage if change of positions is attempted when the deflector blade 37 is frozen or jammed. At the middle of the drag link 40 there is a connection plate 41 to which are attached the piston rods 42 of hydraulic operating cylinders 43R and 43L. When cylinder 43R is operated the lower arm of each of the V-shaped deflector blades 37 of each of the units is moved to the left and accordingly intercepts the ejected snow throwing it to the right as shown in Figure 1. Similarly when the hydraulic cylinder 43L is operated, the snow is delivered to the left.

The rake mechanism, generally designated 50 is best illustrated in Figures 1 and 3, and includes a tubular cross frame 51 having stub end shafts 52 in each end thereof. The shafts are suitably attached to the tubular frame 51 by welding pins or by any other suitable method. The stub end shafts are of such a length as to be positioned above the blades 28 and 29 of the plow, and are trunnioned in bearing blocks 53 mounted on the plow frame. At each end of the tubular frame 51 there is a solidly attached extending arm 55, both arms 55 being braced by diagonal cross braces 56. The arms 55 are normally in the same plane altho, under stress, one or the other of the arms may be deflected, thus imposing a twisting movement upon the tubular frame 51.

To the remote extending portion 58 of each of the arms 55 there is attached a hydraulic elevating mechanism, generally designated 60, best illustrated in Figure 3. The hydraulic elevating mechanism 60 is of the two-direction type, being provided with hydraulic pressure tubes 61 and 62 into which oil may be forced thereby positioning the piston shaft 63 in any desired position in which it is held under hydraulic lock when valves in lines 61 and 62 are closed. The lower end of the hydraulic mechanism is pivotally mounted on the plow as illustrated at 65. The upper end of the piston shaft 63 is flattened as shown at 64 (Figure 4) and to it there is attached a U-shaped strap 66. The strap provides an elongated opening 67 between the end of piston rod 63 and the strap's extremity. Upon both sides of each of the arms 55 there are welded or attached spaced gusset plates 69, which are provided with a plurality of apertures 70 through which a clevis pin 71 passes. The pin 71 may be placed in either of the apertures 70 for varying the range of movement of the rotary rake frame with respect to the movement of the hydraulic piston shaft 63. The pin 71 carries a U-shaped bracket 72 which is turned at right angles to the U-shaped strap 66. Upon the upper outer end of the U-shaped strap 66 there is welded the head of a thru bolt 74 which carries a washer 75 and a compression spring 76, the latter bearing against the underside 77 of the U-shaped bracket 72.

The bolt 72 is provided with a pair of adjusting nuts 78 which are used initially to place the spring 76 under considerable compression. The force of piston rod 63 for adjustably positioning the rake frame is accordingly transmitted from the rod 63 thru the U-shaped bracket 66 thru the head of bolt 74, washer 75, spring 76, to the underside of the U-shaped strap 77, which, in turn, thru tension lifts the pin 71 passing thru the spaced gusset plates 69 on the arm. When the hydraulic cylinder has been adjusted to any desired position, flow of the hydraulic liquid thru hoses 61 and 62 is prevented by suitable shutoff valves and the piston rod 63 is thus adjustably positioned against movement in either direction. When an extraordinary upward force is imposed upon either end of the rake frame arms 55 this force is transmitted thru pin 71 and pulls downwardly upon the U-shaped bracket 72 thus compressing spring 76 without moving the piston rod 63 which is held hydraulically. It will be noted that the pin 71 is free to move within the limits of the space 67. Thus the rake frame may be momentarily deflected without imposing undue stress upon the hydraulic positioning mechanism 60. After the deflecting stress has passed, the spring 76 again pulls the U-shaped bracket 72 upwardly until the pin 71 is held tightly against the underside of the U-shaped strap 66.

The rake frame arms 55 are preferably of box construction made up either by welding a blade on a channel section or by welding together suitable angles or plates. The outer end of each of the arms 55 is cutaway, as illustrated at 80, and an end block 81 is welded in. The end block 81 of the arms are drilled out along the axis of the arm as shown in Figure 5 and constitutes a bearing for stub shaft 86. Shaft 86 has a bearing sleeve portion 87, within which there is a self-oiling bronze bushing or other suitable bearing 88. By this construction, the bearing 88 is permitted to turn freely about the axis of stub shaft 86 and the position of the bearing 88 with respect to the rake frame member 51 is adjustably positionable by means of a plurality of shims 90A and 90B which are held in place by collar 91 and pin 92. By shifting the shims 90A to position 90B or vice versa it is possible to move the axis of bearing 88 closer or farther away from the rake frame member 51 as desired for adjusting the tension of the rake drivechain.

The rotary rake shaft, generally designated 95, is preferably constructed of a tubular pipe 96 having welded-in blocks 97 carrying end shafts 98 (Figure 5). Thrust washers are provided at 99, and upon the outwardly extending portion of the stub shafts 99, there are positioned tubular end members generally designated 100L and 100R, each of which has a flange 101. The flanges 101 are provided for mounting the slicing blades 102, which are held in place by thru bolts 103.

Upon the rotary rake shaft 95 there is a plurality of rake seats, which are identical except for their angular position. Each of the rake seats is composed of two diametrically disposed lugs 105 extending lengthwise of the pipe 96 and welded in place. The angular position of the plane thru the lugs 105 at one of the seats is about 60° displaced from the corresponding plane of the next succeeding rake seat so that when the rakes, generally designated 110, are similarly mounted upon the rake seats, they likewise will be disposed at 60° angular positions along a spiral. Similar rake seats 106 are provided in the tubular end members 100R and 100L.

Except for the two short central blades generally designated 120, which may optionally be dispensed with in some installations, each of the rakes has the following construction:

The base of the rake is a short length of angle iron 111 having the outer ends of the angle pierced to receive a pair of bolts 112 which are held in place by nuts 113. The angles lie lengthwise on shaft 96. Extending outwardly along a line approximately bisecting the angle of the angle iron, there is a rake plate 114, which is straight thruout most of its length but curved at its tip in the direction of rotation as shown at 115. The rake plate is preferably shortened into a cutting edge. The convex portion of the curved tip is provided with a central splitter blade 116, and the back of the rake plate 114 is supported by a triangular gusset plate 117 welded onto the rake plate 114 and to the angle iron 111. Each of the rakes is thus of exceedingly rugged construction and is held onto the rotary rake shaft without any impairment of the strength of that shaft, since the U-bolts 112 and the lugs 105 tend to strengthen rather than weaken the rotary rake shaft.

The rotary rake shaft is rotated in the direction of arrow 121 (Figure 1) by means of a sprocket wheel 122 mounted on a flange 123, the latter being carried on tubular end shaft 100R. The sprocket 122 is aligned with a smaller sprocket 124 solidly attached to the bushing 125. The bushing 125 also carries a larger sprocket 126 which is aligned with a primary drive sprocket 127. The bushing 125 rotates on stub end shaft 52 of the rake frame.

To the right end of the snow plow rotor shaft 35, as shown in Figures 1 and 3, there is an extending shaft 130, which passes thru the snow plow moldboard and is supported by an outboard bearing 131 on the snowplow. Shaft 130 carries sprocket 127 and thru the medium of driving chains 133 and 134 the rotary motion of the snowplow rotor is mechanically transmitted to the rotary rake. The adjustment of the tension of chain 133 may easily be accomplished by the insertion or removal of shims under the supporting bearing 53 at the right as shown in Figure 1, and the adjustment of chain 134 may likewise be accomplished by the shifting of shims at positions 99A and 99B of Figure 5 as hereinbefore explained.

In operation the truck or automotive unit 10 is driven directly into the snow, and as the snow is gathered and moved into the recesses of the W-shaped moldboard, rotary impellers 32R and 32L engage and direct the snow thru the discharge mechanism 36R and 36L either to the right or left according to the position of V-shaped deflector blades 37. The position of the latter may be adjusted at will by the operator by applying pressure to one or the other of hydraulic cylinders 43R and 43L. The motive power for rotating impellers 32R and 32L and the rotary rake may be supplied either by the automotive propulsion engine of the unit 10 or by a separate power source mounted upon the rear platform 11 of the propulsion unit.

The position of the rotary rake is adjustable from the lowermost position shown in Figure 3 to an elevated position in which the arms 55 are held along the line 136, and the range of movement may be varied by changing the position of pin 71 from the one to the other of the apertures 70 in the spaced gusset plates 69. The rakes, generally designated 110, are rotated at a rate somewhat slower than the impellers 32R and 32L, and break and chop down the incrusted snow and ice in front of the plow. In the most elevated position, the rakes are able to engage the surface of snow as high or higher than the cab of the propulsion unit 10 thus preliminarily moving the snow downward where it may be engaged by the plow. The outer slicing blades 102 produce a clean cut at the sides of the unit thus decreasing danger of caving in of the snow, and the central blades 120 and rakes 110 chop and cut the hardened snow and ice so that it may be readily removed by the snowplow. By thus preliminarily cutting and breaking up the snow, the amount of power required for the rotary snowplow is reduced from 30 to 50% of the amount required where the entire snow removal operation is accomplished by the rotary snowplow itself. In the lowered position the rakes are very useful in breaking up roadside accumulated snow for loading operations.

Figure 6:
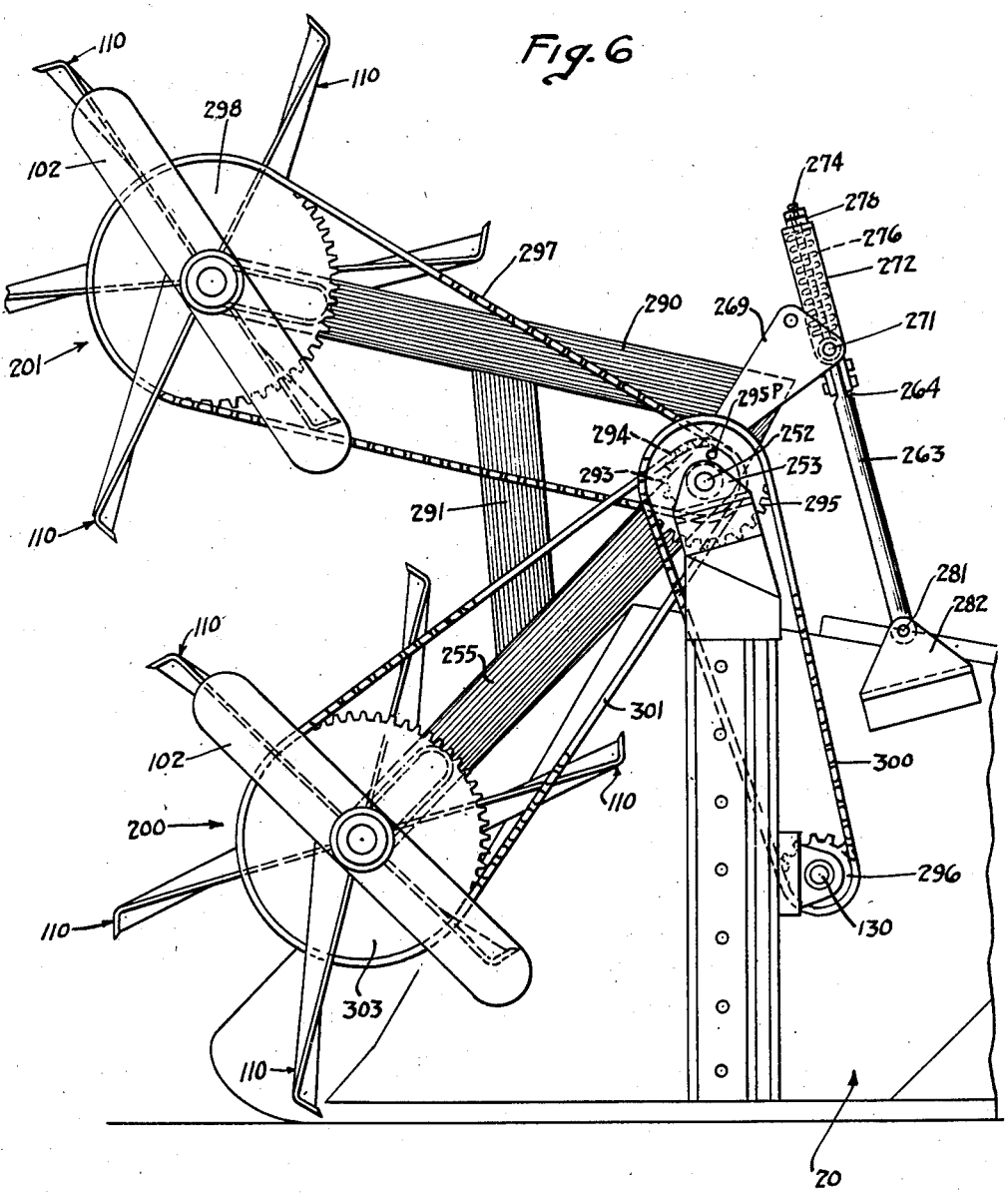

In the modification shown in Figures 6 and 7 there are two rotary rakes generally designated 200 and 201 which are essentially the same in construction and bearing mounting as the rotary rake of the device shown in Figures 1 and 3. The lower rotary rake 200 is mounted on a frame composed of arms 255, mounting shaft 251, diagonal braces 256—256 which may, for uniformity of manufacture, be the same as that illustrated in Figures 1 and 3. The mounting shaft 251 is preferably of tubular material and is provided with stub shafts 252—252 which are carried in pillow blocks 253 on the plow. The frame just referred to is provided with rear gussets 269 as in Figure 1 and the supporting mechanism composed of brace rod 263, strap 272, spring 276, bolt 274, and nuts 278 may all be identical with the corresponding parts of the device in Figures 1 and 3, except that the rod 263 is pivotally attached to the plow by pivot pin 281 and bracket 282 instead of being the piston rod of a hydraulic mechanism as in Figures 1 and 3. By means of this construction the frame arms 255 and frame are permitted a limited lifting movement in case the rotary rakes strike exceedingly hard snow or obstructions.

The upper rotary rake 201 is preferably positioned above and slightly forward of the lower rake 200 and is carried on arms 290—290 which are solidly attached to arms 255 as by welding or riveting. Braces 291 are attached to arms 290 and 255 and serve to support arms 290 from arm 255.

Upon the right hand stub shaft 252 (as shown in Figure 7) there are journalled three sprocket gears 293, 294 and 295. Each gear has a separate bearing and may rotate independently of the others on shaft 252. Gear 295 (the larger gear) is connected by chain 300 to a driving sprocket 296 on shaft 130 which is an extension of the main rotor shaft of the plow. Gears 295 and 294 are provided with means for joining either gear 294 or both gears 293 and 294 to the driving gear 295 for rotation therewith. This may conveniently be in the form of one or more eccentric pins mounted on gear 295 for movement parallel to shaft 252 into an aperture in gear 294, so as to drive gear 294 from 295 and, if desired, entirely thru gear 294 into gear 293, so as to drive both gears 293 and 294 from gear 295. The eccentric pin (or pins) are designated 295P in Figures 6 and 7.

Sprocket chain 300 is arranged to run on aligned sprocket gears 295 and 296, chain 297 runs on aligned sprockets 293 and 298 (of the upper rotary rake) and chain 301 runs on aligned sprockets 294 and 302 (of the lower rotary rake). Thus with the plow rotor operating sprocket 296 drives sprocket 295 which, in turn, may drive gear 294 alone or gears 294 and 293 depending upon the setting of the eccentric pin 295P. In this manner either the lower rake 200 alone or both the lower and upper rakes 200 and 201 may be rotated.

If desired, the gear ratios of gears 293—298 and 294—302 may be varied so as to rotate the upper rotary rake 201 at a higher speed or at a lower speed than lower rotary rake 200.

In this manner when the rotary drive shaft 130 is turning sprocket 296 turns and rotates the rakes 200 and 201. Rake 201 may be arranged to rotate at a slower speed as the amount of material to be broken up is usually less than that engaged by rotary rake 200. When the snow thickness decreases sprocket 294 may be disengaged from sprocket 293 by withdrawing drive pin 295P, whereupon the upper rake chain 297 and sprocket 293 remain quiet while the remainder of the machine is in operation. Likewise, by entirely withdrawing pin 295P from gears 293 and 294 both rakes may be stopped, brace rods 263 may be disengaged and the entire rotary rake assembly tilted up out of the path of a small snow layer. When so elevated, the rotary rake frame may be held by suitable stay chains or hooks.

Should the rakes strike an obstruction while rotating, the entire frame composed of mounting shaft 251 and pieces 255, 290 and 291 at one or both ends may deflect upwardly against the action of springs 276 as the bearings carrying the rakes 200 and 201 are trunnion mounted in bearing blocks 253.

Various details in the construction of the apparatus herein illustrated may obviously be made by those skilled in the art and are deemed within the range of equivalents of the invention claimed.

What I claim is:

1. In combination with a rotary snowplow, a mounting shaft horizontally disposed on the plow transversely of the direction of motion thereof and journalled thereon, a pair of forwardly extending frames attached to said mounting shaft, a pair of horizontally disposed rotary rake shafts extending transversely to the direction of motion of the plow and journalled on the forwardly extending frames, said rotary rake shafts being positioned one above the other and forwardly of the plow, rake members on the rake shafts, driven wheels on each of said rake shafts, and a pair of cooperating driving wheels journalled concentrically with said mounting shaft, flexible drive belts connecting each of said driving wheels, and one of said driven wheels, and means for rotating said driving wheels.

2. The combination set forth in claim 1 further characterized in that said means for rotating said driving wheels is arranged to be coupled to one or both driving wheels for rotating one or both of said wheels.

3. The combination set forth in claim 1 further characterized in that the means is provided for yieldably restraining backward rotation of said mounting shaft whereby said forwardly extending frames and the rotary rakes mounted thereon are restrained from lifting.

4. In combination with a rotary snowplow, a rotary rake mechanism comprising a frame mounted transversely of the direction of motion of the plow and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, one such ram being connected to each arm and to the plow whereby the arms and frame are swingingly positionable in desired angular positions from low to high in front of the plow, a rake shaft substantially parallel to the frame and spaced therefrom, a bearing for each end of said shaft, said bearing being mounted for rotation about a rotation axis at right angles to the bearing axis, said rotation axis being substantially co-extensive with the axis of said arms, a plurality of rake arms mounted on the rake shaft, and power transmission means from the plow rotor to the rotary rake shaft for rotating the latter in any angularly elevated position.

5. In combination with a rotary snowplow, a rotary rake mechanism comprising a frame mounted transversely of the direction of motion of the plow, and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, one such ram being connected to each arm and to the plow whereby the arms and frame are swingingly positionable in desired angular positions from low to high in front of the plow, a rake shaft substantially parallel to the frame and spaced therefrom, a bearing for each end of said shaft, said bearing being mounted for rotation about a rotation axis at right angles to the bearing axis, said rotation axis being substantially coextensive with the axis of said arms, shim means for adjustably positioning each of said bearings with reference to the arm carrying the bearing for adjustably varying the distance between the rake shaft and frame, a plurality of rake arms mounted on the rake shaft and power transmission means from the plow rotor to the rotary rake shaft for rotating the latter in any angularly elevated position.

6. In combination with a rotary snowplow, a rotary rake mechanism comprising a frame mounted transversely of the direction of motion of the plow, and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, a spring connection between each ram and the arm to which it is connected whereby the arms and frame are positionable by movement of the rams but the arms and frame are slightly movable with respect to the rams when an arm is heavily stressed while working, a rake shaft rotatably mounted on said arms substantially parallel to the frame, a plurality of rake arms mounted thereon and power transmission means from the plow rotor to the rotary rake shaft for rotating the latter in any angularly elevated position.

7. In combination with a rotary snowplow, a rotary rake mechanism comprising a frame mouned transversely of the direction of motion of the plow, and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions each of said rams having a piston rod, a first U-shaped strap fastened to the rod forming an elongated loop at the end of the rod, a second U-shaped strap having its ends pivotally connected to its arm of the frame by a pivot pin passing thru the loop of the first U-shaped strap, a compression spring positioned between the first and second U-shaped straps for normally forcing the first strap against said pivot pin but permitting movement of said pin in the loop of the first U-shaped strap and accompanying compression of said spring when the arm is moved under stress with reference to the piston rod, a rake shaft rotatably mounted on said arms substantially parallel to the frame, a plurality of rake arms mounted thereon and power transmission means from the plow rotor to the rotary rake shaft for rotating the latter in any angularly elevated position.

8. In combination with a rotary snowplow, a rotary rake mechanism comprising a frame mounted transversely of the direction of motion of the plow, and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, one such ram being connected to each arm and to the plow whereby the arms and frame are swingingly positionable in desired angular positions from low to high in front of the plow, a rake shaft rotatably mounted on said arms substantially parallel to the frame, a plurality of rake mounting seats on the outer surface of said rake shaft at spaced intervals, each of said seats comprising diametrically disposed protuberances extending parallel and lengthwise of the rake shaft, a plurality of rake arms mounted on the rake shaft at said seats, each rake arm having an angle plate embracing one side of the rake shaft and the protuberances at said seats, said angle plates being held in place by U-bolts around the shaft, and power transmission means from the plow rotor to the rotary rake shaft for rotating the latter in any angularly elevated position.

9. In combination with a rotary snowplow, a rotary rake mechanism comprising a frame mounted transversely in the direction of motion of the plow, and above the plow a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, one such ram being connected to each arm and to the plow whereby the arms and frame are swingingly positionable in desired angular positions from low to high in front of the plow, a rake shaft rotatably mounted on said arms substantially parallel to the frame, a plurality of rake arms mounted thereon, each of said rake arms comprising a flat plate bent in a curve at one end, a splitter blade extending lengthwise of the rake arm and midway between the sides thereof thruout said curved portion, and power transmission means from the plow rotor to the rotary rake for rotating the latter in any angularly elevated position of the rake shaft.

10. In combination with a rotary snowplow, a rotary rake mechanism comprising a frame mounted transversely of the direction of motion of the plow and above the plow, a pair of arms extending generally forwardly of the frame, said arms being normally in the same plane and solidly connected to the frame, brackets on the plow pivotally mounting the frame for rotary movement about its own axis whereby the arms are swingable up and down, hydraulic rams, one for each arm, said rams having positive hydraulic action in two directions, one such ram being connected to each arm and to the plow whereby the arms and frame are swingingly positionable in desired angular positions from low to high in front of the plow, a rake shaft rotatably mounted on said arms substantially parallel to the frame, a plurality of rake arms mounted thereon, each of said rake arms comprising a short length of angle iron extending lengthwise of the rake shaft and fastened thereto with the angle outward, a flat rake plate welded to the angle iron at the apex of the angle and extending outwardly therefrom, a reinforcing gusset plate welded to the back of the flat rake plate thruout a major portion of its length and welded to the angle iron, said flat rake plate being curved at its outer end in the direction of rotation.

CHRIS B. JENSEN.